3,644,506
PREPARATION OF AROMATIC CARBOXYLIC ACIDS

Roger C. Williamson, Allison Park, Pa., assignor to Gulf Research & Development Company, Pittsburgh, Pa.
No Drawing. Filed Mar. 28, 1969, Ser. No. 811,660
Int. Cl. C07c 63/02
U.S. Cl. 260—524 R                    15 Claims

ABSTRACT OF THE DISCLOSURE

The improvement in a process wherein a mixture containing in excess of about 13 percent by weight of an aromatic compound, in which the aromatic group carries at least one methyl substituent, is subjected to oxidation with molecular oxygen in an inert reaction medium in the presence of a cobalt, nickel, chromium or manganese catalyst to obtain the corresponding aromatic carboxylic acid, which involves controlling the amount of water in the initial reaction mixture so that it is below about 0.9 percent by weight.

---

This invention relates to a process for converting an aromatic compound in which the aryl group carries at least one methyl nuclear substituent, preferably benzene carrying from one to four methyl substituents. In a preferred embodiment this invention relates to a process for quickly and efficiently converting para xylene to terephthalic acid.

In the prior art, as exemplified by U.S. Pat. No. 3,036,122, dated May 22, 1962, to Ardis et al., it is stated that in order effectively to convert an aromatic compound carrying an alkyl substituent by oxidation in the presence of a cobalt compound to the corresponding aromatic carboxylic acid, it is necessary that the mixture being subjected to oxidation also contain a relatively large, but controlled amount, of water as an essential ingredient. Thus, Ardis et al. maintain an initial water content in the reaction mixture of one to nine percent. I have found, however, that when the reaction mixture to be subjected to oxidation contains amounts greater than about 13 percent by weight of the aromatic compound defined hereinabove, for rapid and efficient conversion thereof to the corresponding aromatic carboxylic acid the amount of water initially present is, in fact, critical but the amount thereof must be less than about 0.9 percent by weight.

As noted hereinabove the aromatic compound subjected to oxidation is one in which the aryl group carries at least one methyl nuclear substituent. Specific examples of aromatic compounds that can be employed are toluene, and mono-, di-, tri-, tetra- and penta-substituted toluenes, such as p-chlorotoluene, xylenes, methoxy p-xylene, pseudocumene, durene; substituted biphenyls, such as p,p'-dimethylbiphenyl; substituted phenyl sulfones, such as 3-methyl, 4'-chlorodiphenyl sulfone, substituted benzophenone, such as p,p'-dimethylbenzophenone, etc. Of these I prefer to employ para xylene.

As catalyst I can use any compound of cobalt, nickel, chromium or manganese that is soluble in the reaction mixture and will provide the corresponding ions thereof. Examples of such compounds that can be used include the acetates, propionates, butyrates of cobalt, nickel, chromium and manganese. Of these the cobalt salt of acetic, propionic or butyric acid is preferred, with the cobalt salt of acetic acid being especially preferred. The amount of catalyst employed, as cobalt, can be, for example, from about 0.5 to 10, preferably from about one to about five percent by weight based on the reaction medium hereinafter defined.

The reaction medium must be inert under the reaction conditions defined herein and is preferably a lower fatty acid, such as acetic acid, propionic acid or butyric acid. In a preferred embodiment the reaction medium corresponds to the anionic portion of the cobalt compound and will therefore be acetic acid. The molar ratio of reaction medium to aromatic compound being oxidized can be from about 35:1 to about 2:1, preferably from about 5:1 to about 15:1.

A promoter is not required for the success of the process defined herein, but, in a preferred embodiment, in order to reduce the induction period a promoter is employed. Any promoter that is generally known for the oxidation of the charge material employed herein can be used, for example. Thus, for example, the promoter can be an aldehyde, such as acetaldehyde, propionaldehyde or p-methyl benzaldehyde; an alcohol, such as propanol 2-butanol, or benzyl alcohol; esters of such alcohols, such as sec-butyl acetate; a ketone, such as methyl ethyl ketone, cyclohexanone or diethylketone; a hydrocarbon, such as butane, hexane, cyclohexane, etc. Of these I prefer to employ methyl ethyl ketone. When used about 0.05 to about 10, preferably about 0.1 to about one, mol of promoter per mol of aromatic compound charge will suffice.

For the oxidation any gas containing molecular oxygen, such as air or oxygen itself, can be used. The amount of oxygen required is that amount stoichiometrically needed to convert the alkyl substituents to carboxyl groups.

I have found that when the total reaction mixture contains in excess of about 13 percent, generally in excess of about 18 percent, and especially in excess of about 20 percent, by weight of the aromatic charge, based on the liquid reaction mixture, rapid and efficient conversion of said aromatic compound to the desired corresponding aromatic carboxylic acid requires that the water content of the total initial reaction mixture be maintained below certain critical levels. Thus, I have found that with such reaction mixtures the total water content from all sources within the initial reaction mixture must be below about 0.9 percent by weight, and preferably must be held within a range of about 0.2 to about 0.5 percent by weight. Obviously, water can be introduced into the reaction system in many ways. For example, when acetic acid is used as solvent, it can contain from about 0.3 to about 0.5 percent by weight of water, and when cobaltous acetate tetrahydrate is employed as catalyst each gram thereof can contain about 0.3 gram of water. Removal of water from the individual components or from the mixture can be effected in any suitable manner. For example, each of the individual components that so requires can be subjected to distillation or dehydration to remove water therefrom and thereafter the treated component is added to the reaction system so that the total water content is within the defined critical limits.

The reaction is carried out simply in the usual manner by bringing the reactants together and so maintaining the same at defined temperature and pressure levels until a desired conversion level is reached or until oxygen absorption ceases. Thus, a suitable temperature will range from about 70° to about 170° C. and in general from about 100° to about 135° C., but in a preferred embodiment a relatively narrow temperature range of about 120° to about 130° C. is used. The pressure can be from about 15 to about 1000 pounds per square inch gauge, but preferably is maintained within the range of about 100 to about 600 pounds per square inch gauge. In a preferred embodiment the pressure is maintained wholly, or substantially, with oxygen.

At the end of the reaction period the reaction system is cooled, depressured and any volatile compounds present are flashed off and collected, if desired. Then, for example, when the aromatic charge is para xylene, the resulting mixture is filtered, terephthalic acid is recovered as a solid, and the filtrate can be subjected to distillation, if desired, to remove therefrom water that has been formed during the reaction. If a promoter, for example, methyl ethyl ketone, has been used the undecomposed or unused part thereof will also come off. Left behind is unreacted aromatic charge, for example, para xylene, partial oxidation products thereof, for example, para toluic acid, reaction medium, for example, acetic acid, and dissolved catalyst, for example, cobaltous acetate. Provided that the amount of water is below the amount that can be tolerated in the reaction system, the filtrate can be reused in the reaction system.

A series of runs was made illustrating the procedure and advantages of the process defined herein. Into a 1000 milliliter stainless steel autoclave there was charged in each instance 315 grams of acetic acid, 21.6 grams of methyl ethyl ketone and 7.5 grams of cobaltous acetate tetrahydrate or five grams of cobaltous acetate. Also present in each run was para xylene and water sufficient to constitute a selected weight percent based on the total initial reaction mixture. The autoclave was brought to a pressure of 300 pounds per square inch gauge with oxygen at 120° C. while stirring, after which the pressure was raised to, and maintained at, 500 pounds per square inch gauge. In each instance reaction was continued until oxygen absorption ceased. Since only the water initially present is critical, there was no effort made to remove water formed during the reaction from the reaction zone. The reaction system was cooled to room temperature, depressured and filtered and terephthalic acid recovered by filtration. The results obtained are tabulated below in Table I.

TABLE I

| Run No. | Para xylene, weight percent | Initial water content, weight percent | Reaction time, minutes | Terephthalic acid yields | |
|---|---|---|---|---|---|
| | | | | Grams | percent |
| 1 | 9.2 | 6.0 | 20 | 42.8 | 86.6 |
| 2 | 9.2 | <0.87 | 20 | 42.5 | 86.0 |
| 3 | 16.9 | 5.5 | 185 | 83.5 | 83.5 |
| 4 | 17.9 | 5.4 | 251 | 77.0 | 70.0 |
| 5 | 17.8 | <0.80 | 70 | 99.6 | 90.6 |
| 6 | 19.0 | <0.76 | 95 | 115.0 | 92.0 |
| 7 | 21.0 | <0.73 | 105 | 126.0 | 90.0 |
| 8 | 24.0 | <0.66 | 120 | 146.0 | 88.0 |
| 9 | 24.0 | 4.95 | 180 | 69.0 | 41.5 |
| 10 | 24.0 | <0.20 | 120 | 152.5 | 92.5 |

An inspection of the above data clearly illustrates the advantages of operating in accordance with the procedure defined herein. In Runs Nos. 1 and 2, essentially similar results were obtained with large or small amounts of water present when the para xylene present amounted to 9.2 percent by weight of the liquid reaction mixture. A comparison of Runs 3, 4 and 5 with each other shows that when larger amounts of para xylene are present in the initial reaction mixture the amount of water initially present is critical. Not only was the reaction time (which included the induction period) substantially reduced but the terephthalic acid yield was increased appreciably to 90.6 percent. Comparably improved results were obtained in each of Runs Nos. 6, 7, 8 and 10 with larger amounts of para xylene and controlled amounts of water in the initial reaction mixture. Note that in Run No. 9 with larger amounts of water present than in Run No. 8 or 10 absorption of oxygen continued over a 50 percent longer period but with a tremendous decrease in yields.

Obviously, many modifications and variations of the invention, as hereinabove set forth, can be made without departing from the spirit and scope thereof, and therefore only such limitations should be imposed as are indicated in the appended claims.

I claim:

1. In a process wherein an aromatic compound, in which the aromatic group carries at least one methyl nuclear substituent, is converted to the corresponding aromatic carboxylic acid by oxidation with a gas containing molecular oxygen in an inert reaction medium in the presence of a compound selected from the group consisting of cobalt, manganese, nickel and chromium soluble in the reaction medium and which will provide the corresponding ions thereof at an elevated temperature, the improvement in a reaction system wherein the aromatic charge amounts to at least about 13 percent by weight thereof of maintaining water in the initial charge below about 0.9 percent by weight and maintaining the water of reaction in the reaction system during the reaction period.

2. In a process wherein an aromatic compound, in which the aromatic group carries at least one methyl nuclear substituent, is converted to the corresponding aromatic carboxylic acid by oxidation with a gas containing molecular oxygen in an inert reaction medium in the presence of a cobalt compound soluble in the reaction medium and which will provide the corresponding ions thereof at an elevated temperature, the improvement in a reaction wherein the aromatic charge amounts to at least about 13 percent by weight thereof of maintaining water in the initial charge below about 0.9 percent by weight and maintaining the water of reaction in the reaction system during the reaction period.

3. The process of claim 2 wherein the aromatic charge initially in the reaction mixture amounts to at least about 18 percent by weight.

4. The process of claim 3 wherein the aromatic charge initially in the reaction mixture amounts to at least about 20 percent by weight.

5. The process of claim 2 wherein the water in the initial charge is about 0.2 to about 0.5 percent by weight.

6. The process of claim 2 wherein the aromatic charge is para xylene, the inert reaction medium is acetic acid, the catalyst is cobaltous acetate and the reaction temperature is about 70° to about 170° C.

7. The process of claim 6 wherein the reaction temperature is about 100° to about 135° C.

8. The process of claim 6 wherein the reaction temperature is about 120° to about 130° C.

9. The process of claim 6 wherein the aromatic charge initially in the reaction mixture amounts to at least about 18 percent by weight.

10. The process of claim 6 wherein the aromatic charge initially in the reaction mixture amounts to at least about 20 percent by weight 11. The process of claim 6 wherein the aromatic charge initially in the reaction mixture amounts to at least about 18 percent by weight and water in the initial charge is about 0.2 to about 0.5 percent by weight.

12. The process of claim 6 wherein the reaction temperature is about 100° to about 135° C., the aromatic charge initially in the reaction mixture amounts to at least about 18 percent by weight and the water in the initial charge is about 0.2 to about 0.5 percent by weight.

13. The process of claim 12 wherein the aromatic charge initially in the reaction mixture amounts to at least about 20 percent by weight.

14. The process of claim 12 wherein the reaction temperature is about 120° to about 130° C.

15. The process of claim 14 wherein the aromatic charge initially in the reaction mixture amounts to at least about 20 percent by weight.

References Cited

UNITED STATES PATENTS

| 2,853,514 | 9/1958 | Brill | 260—524 |
|---|---|---|---|
| 2,992,271 | 7/1961 | Hay | 260—524 |

LORRAINE A. WEINBERGER, Primary Examiner

R. S. WEISSBERG, Assistant Examiner

PO-1050
(5/69)

UNITED STATES PATENT OFFICE
CERTIFICATE OF CORRECTION

Patent No. 3,644,506                     Dated    February 22, 1972

Inventor(s)    Roger C. Williamson

It is certified that error appears in the above-identified patent
and that said Letters Patent are hereby corrected as shown below:

Column 3, Table I, Run No. 4, "17.9" should be "17.8".

Signed and sealed this 20th day of June 1972.

(SEAL)
Attest:

EDWARD M. FLETCHER, JR.                ROBERT GOTTSCHALK
Attesting Officer                      Commissioner of Patents